E. M. Boynton,
Saw Handle,
N° 99,825.         Patented Feb. 15, 1870.
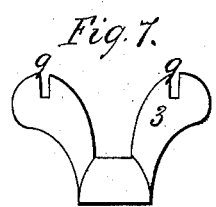
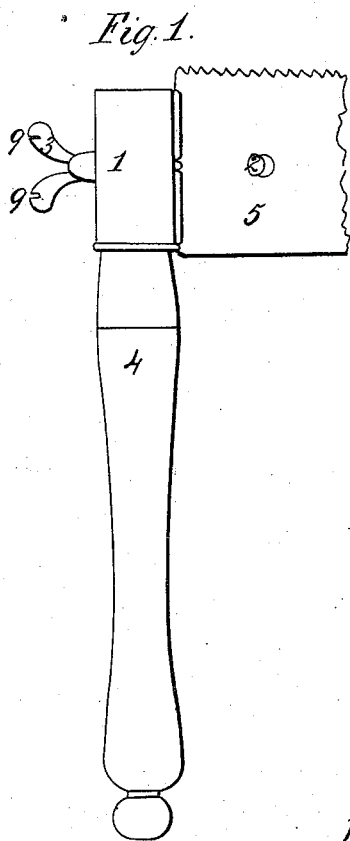
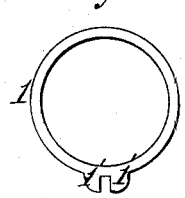
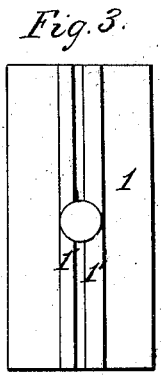
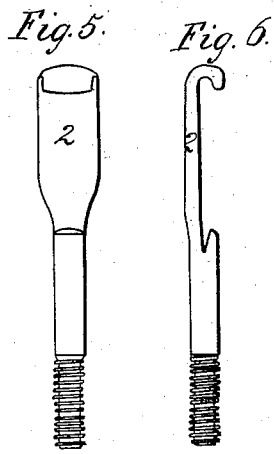
Witnesses;
A. Pelletier
P. T. Dodge.
Inventor;
E. M. Boynton
by Dodge & Munn
his attys.

United States Patent Office.

E. M. BOYNTON, OF GRAND RAPIDS, MICHIGAN.

Letters Patent No. 99,825, dated February 15, 1870.

IMPROVEMENT IN HANDLES FOR CROSS-CUT SAWS.

The Schedule referred to in these Letters Patent and making part of the same.

*To all whom it may concern:*

Be it known that I, E. M. BOYNTON, of Grand Rapids, in the county of Kent, and State of Michigan, have invented certain new and useful Improvements in Handles for Cross-Cut Saws; and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention I will proceed to describe it.

My invention relates to an improvement in handles for cross-cut saws, which serves the double purpose of a handle and that of a set, and which may be readily attached and detached.

In the drawings accompanying—

Figure 1 is a side view of a portion of a saw with my handle attached;

Figure 2 is a bottom end view of the same;

Figures 3 and 4 are views of the socket;

Figures 5 and 6 are views of the clip-bolt; and

Figure 7 is a side view of the thumb-nut.

In making my apparatus I first construct a cylindrical socket 1, having on one side the two ribs 1' 1', as shown in figs. 3 and 4, which extend the whole length of the socket. In this socket I place the ordinary wooden handle 4, as shown in fig. 1. Passing through this socket and handle near its center, and at right angles to its axis, is a hole of sufficient size to permit the passage of a clip bolt 2, as shown in fig. 1. The shape of this bolt is more clearly shown in figs. 5 and 6, it being round for a portion of its length, and having a screw-thread cut on it, the opposite end being flattened and bent into the form of a hook 2', as shown in fig. 6.

The following is the method of attaching my handle to the saw:

The bolt 2 is passed through the hole in the handle, the bent end of the bolt 2 is hooked into the hole 8 in the saw-blade, and the nut being then put on and screwed up forces or draws the handle up against the end of the saw-blade, the two ribs at the same time clasping or engaging over the end of the saw, thus firmly locking the handle in place.

When it is desired to detach the handle, all that is necessary is to loosen the nut enough to allow the bolt 2' to slide forward until the end of the saw comes from between the ribs on the socket, when the handle can be unhooked.

When the handle is to be used as a "set," it is detached from the saw and the nut screwed up as far as it will go, (care being taken that the ears come in line with the handle,) when the slots 9 in the ears of the nut are slipped over the teeth of the saw and the teeth set to the angle desired.

This improvement is especially desirable in the timber districts, when it sometimes becomes necessary to set the saw during the day, when those using it are often miles away from any conveniences for so doing.

By cutting a slot in a log, or splitting a post, and inserting the saw therein and detaching one of the handles, the saw may be set at the spot where the same is being used at any time desired.

Having thus described my invention,

What I claim is—

1. The hook-bolt 2, with its nut 3, in combination with the socket 1, provided with the ribs 1' 1' for securing the handle to the saw, substantially as described.

2. In combination with the hook-bolt 2, the nut 3 provided with the slots 9, so that when detached from the saw, the same may be used as a set, substantially as described.

E. M. BOYNTON.

Witnesses:
P. R. L. PEIRCE,
BENJAMIN ROBINSON.